(12) United States Patent
Schepers et al.

(10) Patent No.: US 6,443,102 B1
(45) Date of Patent: Sep. 3, 2002

(54) APPARATUS AND METHOD FOR LOADING POULTRY INTO CONTAINERS

(75) Inventors: Geert Schepers, Hoogeveen; Henk Lopers, Zuidwolde, both of (NL)

(73) Assignee: Schepers Beheer B.V., Hoogeveen (NL)

( * ) Notice: Subject to any disclaimer, the term of this patent is extended or adjusted under 35 U.S.C. 154(b) by 0 days.

(21) Appl. No.: 09/610,021

(22) Filed: Jul. 5, 2000

(51) Int. Cl.⁷ .............................................. A01K 29/00
(52) U.S. Cl. ........................................ 119/843; 119/846
(58) Field of Search ................................ 119/844, 845, 119/846; 56/181, 183, 185; 198/371.2, 436, 843

(56) References Cited

U.S. PATENT DOCUMENTS

| | | | | |
|---|---|---|---|---|
| 4,765,488 A | * | 8/1988 | Moriarity | 209/551 |
| 4,766,850 A | * | 8/1988 | O'Neill | 119/846 |
| 5,699,755 A | * | 12/1997 | Wills et al. | 119/846 |
| 5,706,765 A | * | 1/1998 | Horton | 119/846 |

FOREIGN PATENT DOCUMENTS

| | | |
|---|---|---|
| EP | 0 024 266 A2 | 8/1980 |
| EP | 0 061 869 B1 | 3/1982 |
| EP | 0 122 682 A2 | 4/1984 |
| EP | 0 143 505 B1 | 11/1984 |
| EP | 0 161 116 A2 | 5/1985 |
| EP | 0 326 422 A2 | 1/1989 |
| EP | 0 384 530 B2 | 2/1990 |
| EP | 0 481 800 B1 | 10/1991 |
| EP | 0 584 142 B1 | 5/1992 |
| EP | 0 563 353 B1 | 10/1992 |
| EP | WO 92/20223 A1 | 11/1992 |
| EP | 0 576 077 B1 | 6/1993 |
| EP | 0 713 642 A1 | 11/1995 |
| EP | 0 713 642 B1 | 11/1995 |
| EP | 0 784 929 A1 | 3/1996 |
| EP | WO 98/12917 A1 | 9/1997 |
| EP | 0 852 115 A1 | 12/1997 |
| FR | 2 593 416 A1 | 11/1986 |

* cited by examiner

Primary Examiner—Peter M. Poon
Assistant Examiner—Floris C Copier
(74) Attorney, Agent, or Firm—Pearne & Gordon LLP

(57) ABSTRACT

Apparatus and method for loading poultry into containers (6). Via a supply track (7, 7') and buffers (19, 20), animals are gathered to form groups and brought into containers (6). A distributing conveyor (33) groups animals alternately in the one and the other one of the buffers (19, 20) and extends from the one buffer to the other buffer. The downstream end (14) of the supply track (7, 7') links up with the distributing conveyor (38) at a point between the buffers (19, 20). The conveying direction of the distributing conveyor (33) is reversed for switching from the conveyance of animals to the one buffer (19, 20) to the conveyance of animals to the other buffer (19, 20). The moment at which a switch is made from transferring animals to the other one of the buffers can be accurately determined, while the supply of animals is continued uninterruptedly. The apparatus can be made of short and compact design.

18 Claims, 4 Drawing Sheets

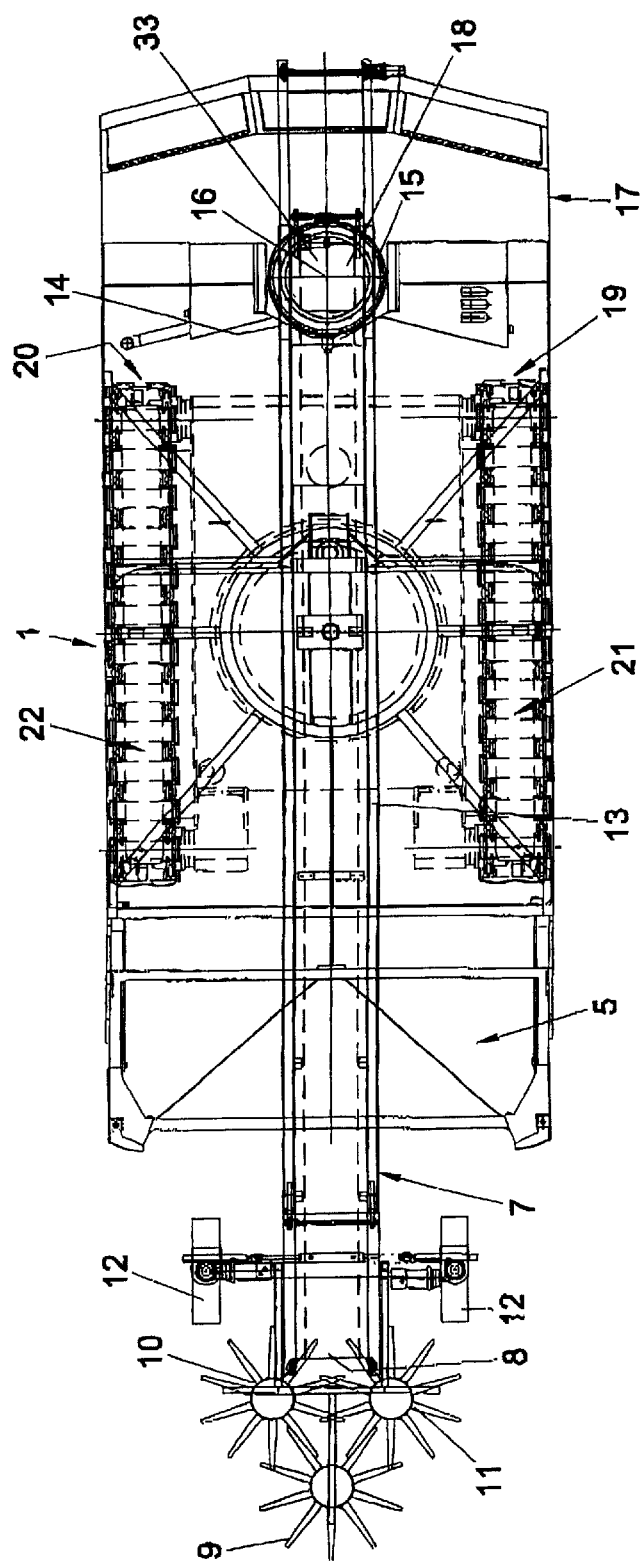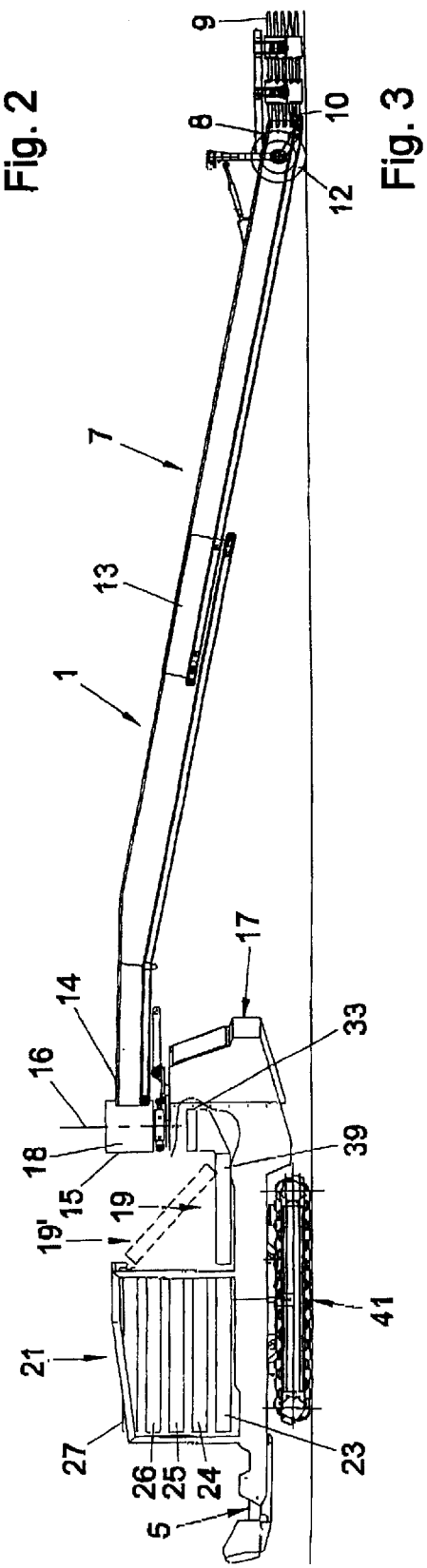

APPARATUS AND METHOD FOR LOADING POULTRY INTO CONTAINERS

FIELD AND BACKGROUND OF THE INVENTION

This invention relates to an apparatus and a method for loading poultry into containers. Such an apparatus and such a method are known from European patent application 0 713 642.

This apparatus comprises a supply track for feeding caught animals, at least two buffers, each for gathering and receiving a group of animals to be loaded into a container, and a distributing conveyor with a drive. The distributing conveyor is disposed between the supply track and the at least two buffers mentioned. The distributing conveyor serves for transferring animals supplied via the supply track alternately to different ones of the at least two buffers. The method described in this document comprises supplying caught animals along a supply track and alternately gathering animals to be jointly loaded into a container in at least two different buffers by transferring animals supplied via the supply track, via a distributing conveyor alternately to the one and the at least one other one of the at least two buffers.

In the use of this known apparatus and this known method, the alternate gathering of animals supplied via the supply track is carried out by swinging a distributing conveyor, an upstream end of which is aligned with a downstream end of the supply track, between positions in which the downstream end of the distributing conveyor terminates in the different buffers for alternately delivering animals to the different buffers.

A drawback of this known apparatus and method is that while the distributing conveyor is being swung from a position in which it terminates in one of the buffers to a position in which it terminates in an other one of the buffers, supplied animals may end up in either buffer as well as on a partition between two buffers. To prevent this, the supply of animals could be interrupted while the distributing conveyor is being swung, but this means that the long upstream supply track and the catching means must be stopped as well.

A further drawback is that the swinging distributing conveyor constitutes a complex construction which takes up much space, leading to a long construction of poor maneuverability which is difficult to transport and occupies much storage space when not in use.

It is an object of the invention to provide an apparatus and a method in which the switch from transferring animals to one of the buffers to transferring animals to an other one of the buffers can be controlled better without interrupting the supply of animals via the supply track. Another object of the invention is to enable a simpler and more compact construction of the apparatus.

To achieve these objects, an apparatus for loading poultry into containers is proposed, which comprises: a supply track for supplying caught animals, at least two buffers, each for gathering and receiving a group of animals to be loaded into a container, and a distributing conveyor with a drive, between the supply track and the two buffers, for transferring animals supplied via the supply track alternately to different ones of the at least two buffers, wherein the distributing conveyor extends from the one of the buffers to the other one of the buffers, the downstream end of the supply track links up with the distributing conveyor at a point between the buffers, and the drive of the distributing conveyor is adapted for driving the distributing conveyor alternately in opposite senses for alternately transferring supplied animals to different ones of the at least two buffers.

The invention also provides an apparatus for loading poultry into containers, comprising a supply track for supplying caught animals, at least one buffer, for gathering and receiving a group of animals to be loaded into a container, while at least ends of the buffer for delivering gathered animals are vertically movable for loading different tiers, further comprising at least one drive means for driving vertical movements of at least the ends of the buffers, which at least one drive means is located at a level above a highest level of the buffers.

For achieving the object mentioned, the invention further provides an apparatus for loading poultry into a container, comprising a supply track for supplying caught animals, a container elongate in a longitudinal direction for receiving supplied poultry, a buffer, between the supply track and the container, for gathering supplied poultry into a group and for transferring gathered poultry in groups in a conveying direction of the buffer to the container, and wherein the longitudinal direction of the container operatively extends transversely to the conveying direction of the buffer.

To that end, the invention further provides a method for loading poultry into containers, comprising: supplying caught animals along a supply track, alternately gathering animals to be jointly loaded into a container in at least two different buffers by transferring animals supplied via the supply track, via a distributing conveyor alternately to the one and the at least one other one of the at least two buffers, wherein a switch is made from transferring animals to the one of the buffers to transferring animals to the at least one other one of the buffers by reversing the conveying sense of the distributing conveyor, while the supply of animals to the distributing conveyor is continued uninterruptedly, for the practice of which method the apparatus according to the invention is specifically adapted.

By reversing the conveying direction of the distributing conveyor, the moment at which a switch is made from transferring supplied animals to the one of the buffers to transferring supplied animals to the other one of the buffers is accurately determined and animals are prevented from being temporarily delivered above the partition between the two buffers. At the same time, moreover, the supply of animals via the supply track can be continued uninterruptedly. Temporarily, the distributing conveyor then has a higher degree of occupation, in that animals that had already ended up on the distributing conveyor but had not been delivered by the distributing conveyor yet, are conveyed back along the downstream end of the supply track, there meeting the flow of animals being supplied by the supply track. However, by suitably adjusting the dimensioning and conveying speeds of the supply track and of the distributing conveyor to each other, this does not entail any problems.

Because the distributing conveyor extends in a fixed position, it can be made of simple construction and compact structure. The location of the distributing conveyor in a position in which it extends from one of the buffers to an other one of the buffers moreover contributes to a short and compact structure of the apparatus.

Because the drive means is located at a level above a highest level of the buffers, a compact apparatus is enabled.

By providing a container whose longitudinal direction operatively extends transversely to the conveying direction of the buffer, it is possible to load the container rapidly, and the container can be brought into a loading position with little maneuvering.

Further objects, elaborations, effects and details of the invention are elucidated below on the basis of an exemplary embodiment presently preferred most.

BRIEF DESCRIPTION OF THE DRAWINGS

FIG. 2 is a transparent top plan view of the apparatus according to FIG. 1 in a storage condition.

FIG. 3 is a locally cutaway side elevation of the apparatus according to FIGS. 1 and 2 in an operating condition.

DETAILED DESCRIPTION

Figure 4:
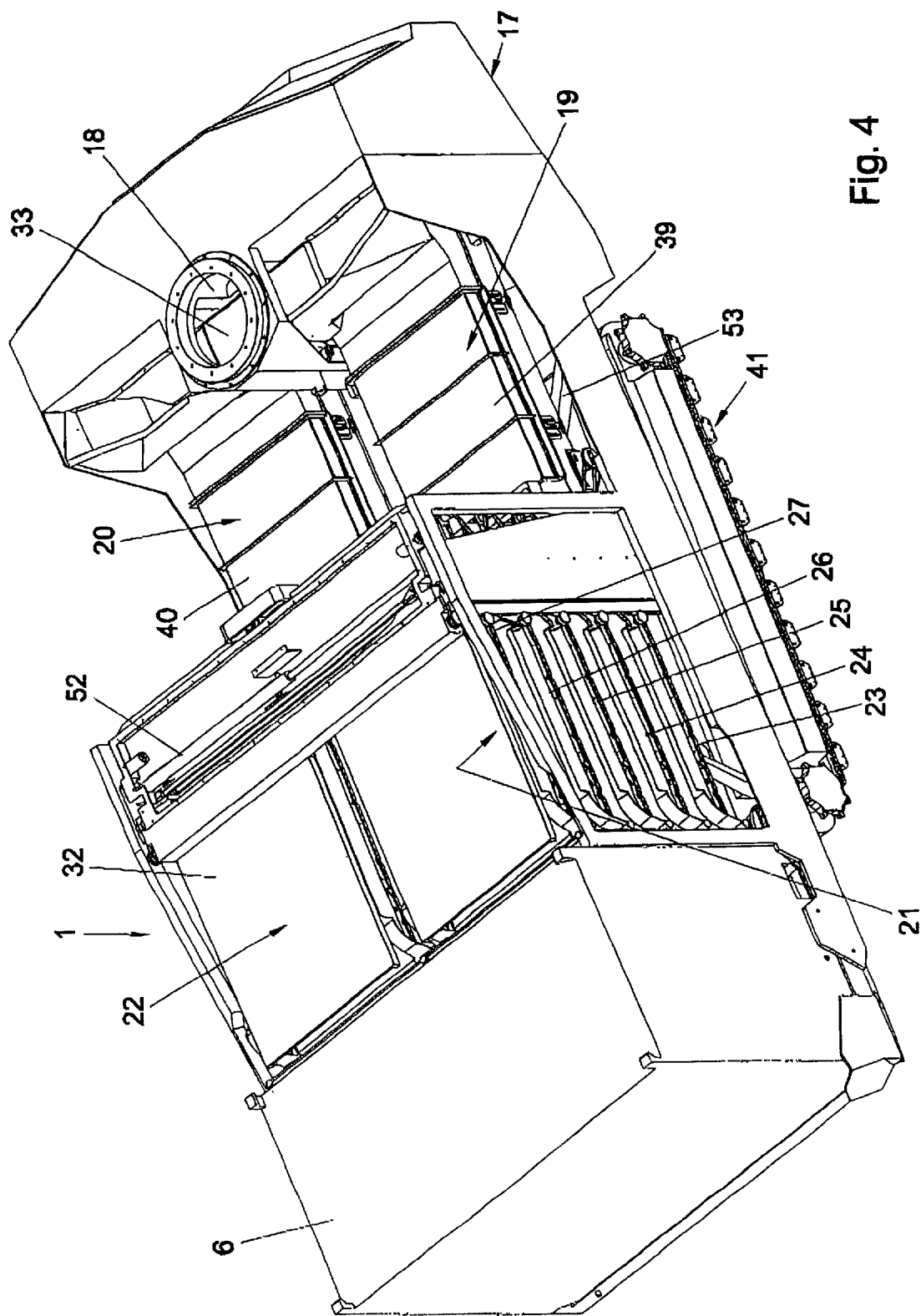
FIG. 4 is a perspective view of the apparatus according to FIGS. 1–3 without supply track.

The apparatus 1 for loading poultry, such as table chickens and table cocks, according to the example represented in the drawing is also intended for catching the animals that are present on a floor 2 of a shed bounded by walls 3, 4. More particularly, the apparatus is adapted for receiving a container 6 at a loading position 5 (see FIGS. 2 and 3), the container 6 comprising a number (in this example five) of tiers for receiving animals. The container 6 (see FIGS. 1, 4 and 5) for use in combination with the apparatus 1 according to this example has a nominal length of 2.5 m, so that when placed transversely on a truck, it covers the entire width of the truck.

Figure 1:
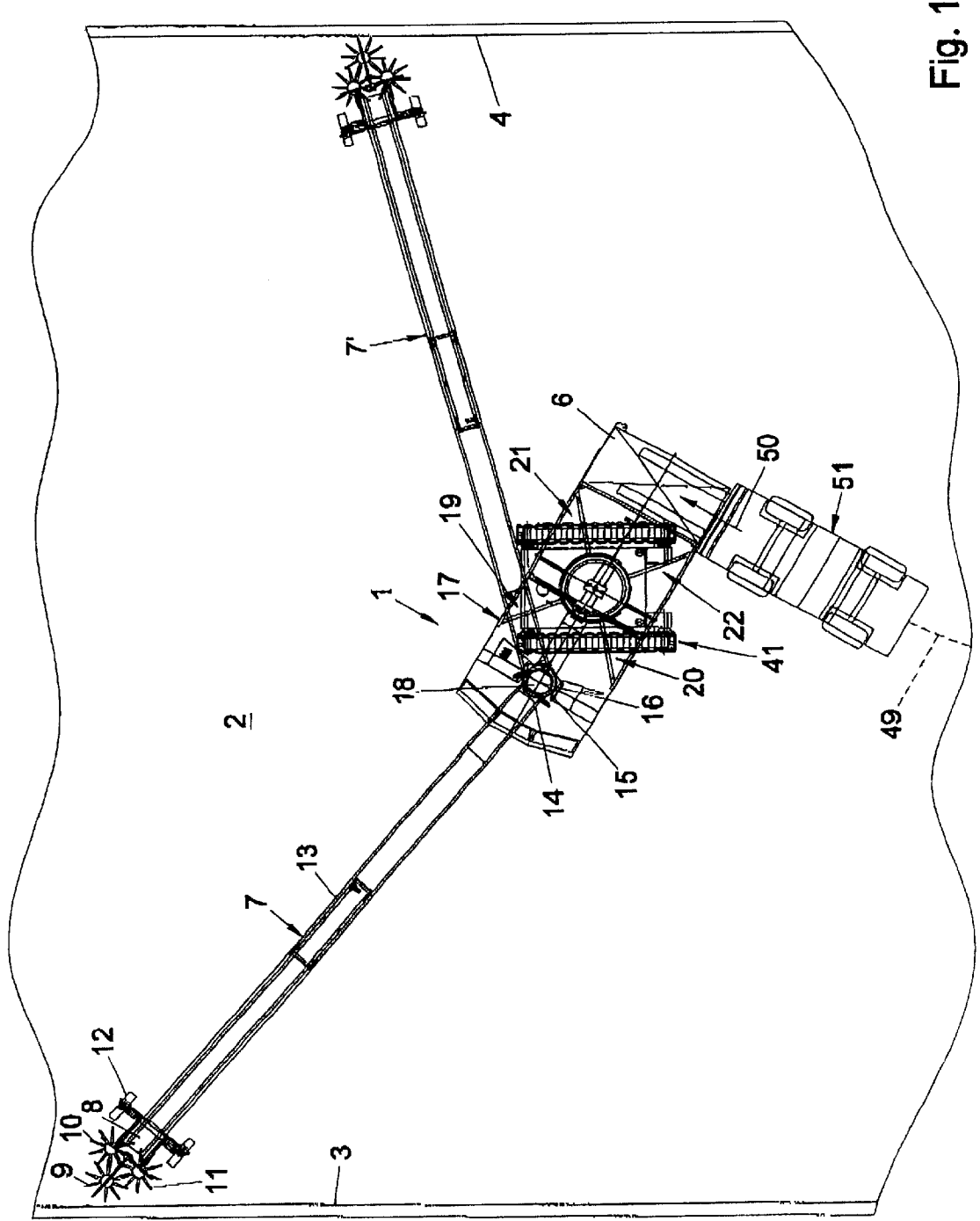
FIG. 1 is a transparent top plan view of an exemplary embodiment of an apparatus according to the invention in an operating condition in a shed and while being loaded by a forklift truck.

The apparatus comprises a supply track 7 for supplying caught animals. This supply track is represented in FIG. 1, not only in a first position 7 but also in a second position 7', to illustrate the working width that can be covered by the proposed apparatus 1. The supply track 7 has an upstream end 8 provided with catching rotors 9, 10, 11 to gently urge the animals from the floor 2 to the track 7. The end 8 further comprises steerable and driven support wheels 12. Further, the supply track 7 is adapted for telescopic sliding movement by variation of the length of the area 13 where two parts of the supply track 7 overlap. The supply track 7 further has a downstream end 14 with a guide 15 which is of cylinder-shaped design and in which terminates a channel formed by the supply track 7. The supply track 7 is pivotable about an imaginary axis 16 with respect to a base frame 17 of the apparatus 1, which axis 16 also forms the centerline of the guide 15. The guide 15 further bounds a vertical chute 18 which continues further into the base frame 17. The construction of the supply track 7 is broadly known per se from practice and therefore not further described in detail.

The apparatus 1 according to this example further comprises two buffers, each adapted for gathering and receiving a group of animals to be loaded into a container 6. These buffers each consist of a first buffer part 19, 20 for gathering animals into groups, and a second buffer part 21, 22 for keeping ready animals which are to be transferred into a container 6. The second buffer parts 21, 22, according to this example, each have five sections 23–27, 28–32 for keeping ready five groups of animals which, after being transferred to the container 6, each occupy half a tier of the container 6.

The structure of the buffer parts 19–32 is described in more detail here only for the first buffer parts 19, 20. The construction of the second buffer parts 27–32 is broadly identical to them. The first buffer parts 19, 20 are each made up of a conveyor belt 37, 38 and a covering 39, 40, located above the conveyor belt 37, 38 (not shown in FIG. 5), which forms a tunnel and keeps the animals constrained against the conveyor belt 37, 38 and along which the animals slide when moving the conveyor belt-37, Because the animals are pressed against the conveyor belt, they do not move with respect to the conveyor belt and the movement of the animals through the buffer parts can be defined by controlling the movement of the respective conveyor belt.

Figure 5:
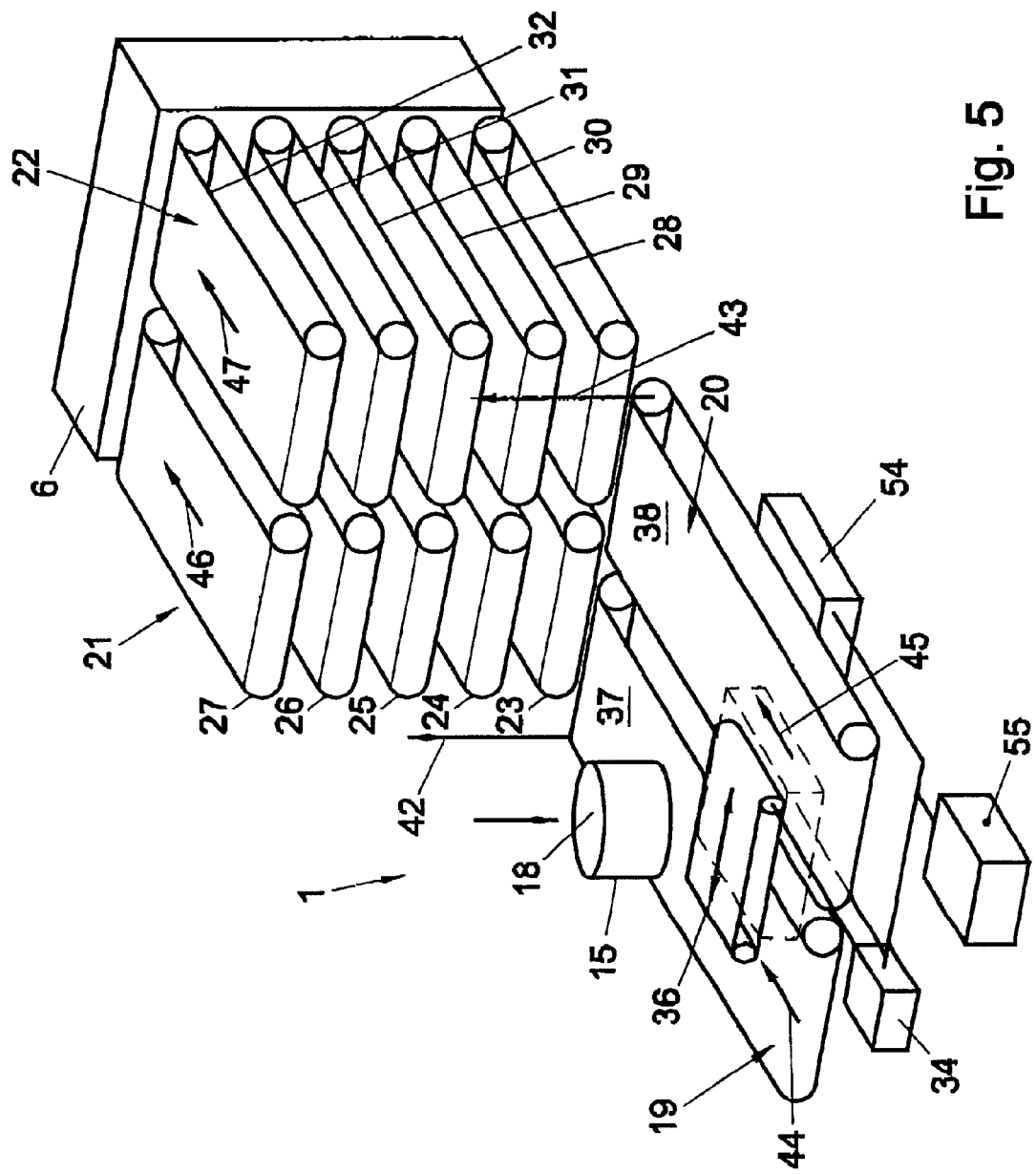
FIG. 5 is a schematic representation of the conveying structure of an apparatus according to FIGS. 1–4.

Located between the supply track 7 and the two first buffer parts 19, 20 is a distributing conveyor 33 with a drive 34 (schematically represented only in FIG. 5), which forms a T-shaped configuration with the supply track. The distributing conveyor 33 extends between the first buffer parts 19, 20 for delivering animals to these two first buffer parts 19, 20. The downstream end 14 of the supply track 7 links up with the distributing conveyor 33 at a point between the first buffer parts 19, 20. For the purpose of transferring animals supplied via the supply track 7 alternately to the one and to the other one of the first buffer parts 19, 20, the drive 34 of the distributing conveyor 33 is adapted for driving the distributing conveyor 33 alternately in opposite senses, as indicated in FIG. 5 by a double-headed arrow 36.

In operation, animals caught by the rotors 9, 10, 11 are supplied along the supply track 7 and fall through the chute 18 onto the distributing conveyor 33.

The animals are gathered in the one and the other one of the buffer parts 19, 20, and periodically a switch is made to gathering animals in the other one of the first buffer parts 19, 20 when the first buffer part 19, 20 in which animals are being gathered contains the desired maximum quantity of animals. The switch from the transfer of animals to the one of the first buffer parts 19, 20 to the transfer of animals to the other one of the first buffer parts 19, 20 is carried out by reversing the conveying sense of the distributing conveyor 33. The supply of animals to the distributing conveyor 33 is meanwhile continued uninterruptedly.

The moment at which a switch is made from the transfer of supplied animals to the one of the first buffer parts 19, 20 to the transfer of supplied animals to the other one of the first buffer parts 19, 20 is accurately determined by reversing the traveling sense of the conveyor 33, thereby preventing animals from being temporarily delivered above the partition between the two buffers. In addition, it is ensured in a highly reliable manner that animals that are located on the distributing conveyor 33 are not, upon a switch of the transfer of animals to the other one of the first buffer parts 19, 20, delivered to the one of the first buffer parts 19, 20 anymore, but are carried away from the one of the first buffer parts 19, 20 to the other one of the first buffer parts.

The supply of animals via the supply track 7 can moreover be continued uninterruptedly. Because shortly after the switch of the transfer of animals to the other one of the first buffer parts 19, 20 animals which had already ended up on the distributing conveyor 33 but had not yet been delivered to the first buffer part 19, 20, are transported back under the downstream end of the supply track 7 and there join the flow of animals that is supplied by the supply track 7, the distributing conveyor 33 temporarily has a higher degree of occupation shortly after this transition. By suitably tailoring the dimensioning and conveying speeds of the supply track and of the distributing conveyor to each other, however, this does not entail any problems. Optionally, after each switch to the transfer of animals to the respective first buffer part 19, 20, the conveying speeds of the conveyors 37, 38 of the first buffer parts 19, 20 can be temporarily increased towards obtaining a degree of filling of those first buffer parts 19, 20 that is constant over the length of the first buffer parts 19, 20.

As the distributing conveyor 33 is located in a fixed position, it can be realized in a constructionally simple design and of compact structure. Being positioned so as to extend from the one of the first buffer parts 19, 20 to the other one of the first buffer parts 19, 20, the distributing conveyor 33 moreover takes up very little length in the conveying direction of the first buffer parts 19, 20, which contributes to a short construction of the proposed apparatus 1.

To enable an apparatus 1 of short construction, it is further advantageous that animals supplied via the supply track 7 are moved by the distributing conveyor 33 to the first buffer parts 19, 20 in a direction, at least initially so, substantially transverse to the direction of discharge via the first buffer parts 19, 20.

In addition to contributing to a short construction of the frame 17, it is further of advantage for the maneuverability of the apparatus 1 that the distributing conveyor 33, the buffer parts 19–22, and the loading position 5 for receiving containers such as the container 6 for receiving animals gathered in the buffers, are mounted on that common frame 17.

During the gathering of animals supplied via the distributing conveyor 33 in the one of the first buffer parts 19, 20, animals from the other one of the first buffer parts 19, 20 are conveyed further to one of the sections 23–27 and 28–32, respectively, of the corresponding one of the second buffer parts 21, 22 To be able to deliver animals to the higher sections 24–27 and 29–32, respectively, the first buffer parts 19, 20 can be raised at their downstream ends as is indicated by the arrows 42, 43 in FIG. 5.

Thus, in each case, during the gathering of animals in the one of the first buffer parts 19, 20, the other one of the first buffer parts 19, 20 is cleared through its advancement to a section of the associated one of the second buffer parts 21, 22. When all sections 23–32 of the second buffer parts 21, 22 are full, the animals gathered therein are brought into the container 6 by inserting the sections 23–32 into the container 6 and retracting them, the animals being delivered from the sections 23–32 by driving the conveyors of the sections 23–32. This means the animals do not need to be urged into the container, but are each delivered at a different point in the container 6. The risk of injuries is thereby reduced and distress of the animals is limited.

The supply of animals via the supply track 7 is continued also during the transfer of animals from the sections 23–32 to the container 6. The capacity of the first buffer parts 19, 20 is such that after the switch to the delivery of animals to an other one of the buffer parts 19, 20, the one of the first buffer parts 19, 20 can be emptied by advancement to the associated one of the second buffer parts 21, 22, the animals in the sections 23–32 of the second buffer parts 21, 22 can be transferred to the container 6 and also the other one of the first buffer parts 19, 20 can be cleared before first the other one and then the one of the two first buffer parts 19, 20 are filled and a switch is to be made again to the gathering of animals in the other one of the first buffer parts 19, 20.

The time available for exchanging the filled container 6 for an empty container 6 is the time which, after the filling of the container, is needed to fill all sections 23–32 of the second buffer parts 21, 22. This means that most of the time no container 6 needs to be present in the loading position 5, and a container needs to be present only when the animals gathered in the sections 23–32 are to be transferred to a container 6.

For facilitating the loading and unloading of containers 6 it is then of particular advantage that the frame 17 is mounted on a chassis 41 adapted for reciprocably pivoting an end of the frame where the loading position 5 is located.

As is illustrated by FIG. 1, the frame 17 carrying the buffers 19-22 and comprising a loading position 5 for the container 6 is pivoted, each time before a container is placed on or removed from the frame 17, into a position wherein the conveying direction of the buffers 19–22 (arrows 44–47 in FIG. 5) is directed at an angle with respect to a transport path 49 (see FIG. 1) of the container 6 over the floor 2 of the shed and wherein the container 6 is supplied or removed via the transport path 49 and is brought into the loading position 5 in a direction (arrow 50 in FIG. 1) substantially transverse to the conveying direction 44–47 of the buffers 19–22.

The transport means such as the forklift truck 51 represented, with which the containers 6 are transported, therefore needs to maneuver only very little to bring the container 6 in the loading position in a position in which the longitudinal direction of the container 6 is directed transversely to the conveying direction 44–47 of the buffers. In this position, the container can be loaded by way of its longest sidewall, which is advantageous for the rate of filling the container 6. The container 6 is then held by the forklift truck 51 in a position with its greatest length in the longitudinal direction of the forklift truck 51, This makes it possible to take the containers 6 sideways from a truck in which the filled containers 6 are to be transported, and to insert the filled containers sideways into that truck. It is noted that these measures for rapidly loading and unloading the containers 6 are of particular advantage in combination with the apparatus which is of short construction and hence easy to pivot, and the increased processing rate which is obtained by virtue of the reversible distributing conveyor 33, but that these can also be applied with advantage in combination with differently designed facilities for gathering animals and introducing them into the container.

In the apparatus 1 according to the example represented, the pivotability of the end of the frame 17 where the loading position 5 is located has been obtained in a particularly simple manner in that the frame 17 is pivotable relative to the chassis 51. This further provides the advantage of preventing the danger that animals, or feet of persons working in the shed, are run over during pivotal movement, and that pivoting requires very little room, For vertically moving the downstream ends of the first buffer parts 19, 20 for delivering gathered animals to different sections 23–32, the apparatus 1 comprises a drive cylinder 52 which is coupled via a system of levers 53 with the first buffer parts 19, 20 for driving vertical movements of the ends of the first buffer parts 19, 20. As this drive means 52 is located at a level above a highest level of the buffer parts 19–22, it does not take up any space laterally of, behind, or under the buffer parts 19–22. As a consequence, the space occupied by the apparatus 1, apart from the supply track 7, can be kept very small and the buffers 19–22 and the loading position 5 can be kept very low. These measures are of particular advantage in combination with the distributing conveyor 33 with reversible conveying direction, which enables a very compact construction of the apparatus, with little space available for auxiliary equipment. The arrangement of the drive means at a point higher than the buffers, however, can also be used with advantage in combination with facilities for distributing supplied animals over the buffers other than a distributing conveyor with reversible conveying direction as proposed, which runs along the end of the supply track and from the one buffer to the other buffer.

The apparatus 1 according to the example shown further comprises a measuring structure for determining quantities of animals present in the first buffer parts 19, 20. According to this example, this measuring structure is formed by a weighing unit 54 for weighing the mass of animals gathered in each of the first buffer parts 19, 20. The weighing unit 54 is connected with a control system 55 for controlling the driving direction of the drive 34 of the distributing conveyor 33. The control system 55 is programmed for reversing the drive 34 of the distributing conveyor 33 in response to reaching limit values of the measured mass of animals gathered on a buffer.

Thus, in operation, the conveying Sense of the distributing conveyor 33 is automatically reversed in response to reaching limit values of the quantity of animals gathered on each of the first buffer parts 19, 20. The control system 55, further, is operatively connected for operating drives of the first and second buffer portions 19–22 and of the drive means 52 for lifting the downstream end of the fist buffer parts 19, 20, but this is not shown in the drawings.

When delivering poultry, it is generally of importance that the quantity of animals being delivered be controlled as accurately as possible. However, the animals constitute discrete entities, so that, for instance, a particular target weight for each filled first buffer part 19, 20 cannot be exactly maintained. Further, it may happen, also when using the proposed distributing conveyor with reversible conveying direction, that the number of animals that is still delivered after a command for reversal of the conveying direction, is greater than normal, for instance in that two or more animals are being delivered virtually simultaneously. In order to be able still to accurately control the number of animals for each container 6, the control system 55 is adapted for registering deviations of the mass of animals gathered on the buffers with respect to target values and for changing the limit values in response to the registered deviations. This makes it possible to operatively adjust the limit values in response to the deviations from target values, so that when gathering animals in the next one of the first buffer parts 19, 20, a previous shortage or an excess that has occurred when gathering animals in the first buffer parts 19, 20 can be compensated.

It will be clear from the foregoing to those skilled in the art that within the framework of the proposed invention, many other elaborations than the example described are possible. Thus, the distributing conveyor can be designed, for instance, as a disc or drum on which the animals are conveyed either to the one of the first buffer parts or to the other one of the first buffer parts. Further, the number of parallel buffers linked up with the supply track can also be greater than two. If three buffers are aligned with the supply track, the distributing conveyor can, for instance, be stopped to transfer animals to the central buffer. Further, the distributing conveyor could be linked up directly with sections of buffers, whence animals are transferred to a container to be loaded, the distributing conveyor being, for instance, wholly or partly movable up and down to switch from filling one section of the buffer to filling another section of the buffer. For controlling the switch of filling between four buffers, for instance a cascade of distributing conveyors of reversible traveling direction can be employed. For determining the quantity of gathered animals, of course, instead of a weighing structure, a counter for counting numbers of gathered animals can be employed.

What is claimed is:

1. An apparatus for loading poultry into containers, comprising:

a supply track for supplying caught animals, said supply track having an upstream end provided with means for urging animals from a floor to the supply track, at least two buffers, each for gathering and receiving a group of animals to be loaded into a container, and a distributing conveyor with a drive, between said supply track and said two buffers, for transferring animals supplied via the supply track alternately to different ones of said at least two buffers, and for switching from transferring animals thereon to one of the buffers to transferring animals thereon to another one of the buffers in response to the buffer to which animals are being transferred containing a desired amount of animals, wherein the distributing conveyor extends from the one of said buffers to the other one of said buffers, the downstream end of said supply track links up with said distributing conveyor between said buffers, and said drive of said distributing conveyor is arranged for driving said distributing conveyor in a conveying sense and for reversing the conveying sense for said switching of the transfer of supplied animals on said distributing conveyor to a different one of said at least two buffers.

2. An apparatus according to claim 1, wherein said distributing conveyor, said buffers and a loading position for receiving a container for receiving animals gathered in said buffers, are carried by a common frame.

3. An apparatus according to claim 1, wherein said buffers and a loading position for receiving a container in a position downstream of at least one of said buffers, for receiving animals gathered in said buffers, are provided on a common frame, which frame is mounted on a chassis arranged for pivoting to and from an end of the frame where said loading position is located.

4. An apparatus according to claim 3, wherein said frame is capable of pivoting movement with respect to said chassis.

5. An apparatus according to claim 1, further comprising a measuring structure for determining quantities of animals present in said buffers, a control system for controlling the driving direction of the drive of said distributing conveyor, which control system is operatively connected with said measuring structure and is programmed for reversing the drive of said distributing conveyor in response to reaching limit values of the measured quantity of animals gathered on a buffer.

6. An apparatus according to claim 5, wherein said control system is adapted for registering any deviations of animals gathered on the buffers with respect to target values and for changing said limit values in response to said registered deviations.

7. An apparatus according to claim 1, wherein said conveying sense of said distributing conveyor is in a direction substantially transverse to a direction of a conveying sense of said two buffers.

8. An apparatus according to claim 7, said conveying sense of said distributing conveyor being at a substantially right angle to said conveying sense of said two buffers.

9. An apparatus according to claim 1, said container having a longitudinal direction thereof, said longitudinal direction of said container extending transversely to a conveying direction of said at least two buffers.

10. A method for loading poultry into containers, comprising:

catching animals, supplying caught animals along a supply track, alternately gathering animals to be jointly loaded into a container in at least two different buffers by transferring animals supplied via the supply track, via a distributing conveyor operating in a conveying sense alternately to the one and the at least one other one of said at least two buffers, and switching from transferring animals on said distributing conveyor to one of the buffers to transferring said animals on said distributing conveyor to another one of the buffers in response to the buffer to which animals are being transferred containing a desired amount of animals, wherein said switch from transferring animals to the one of said buffers to transferring said animals to the at least one other one of said buffers is made by reversing the conveying sense of said distributing conveyor, while the supply of animals to said distributing conveyor is continued uninterruptedly.

11. A method according to claim 10, wherein animals gathered in the buffers are transferred in groups in a conveying direction from said buffers to said container, and wherein a frame carrying said buffers, which frame is provided with a loading position for said container, is pivoted, each time at least before a container is placed in the loading position or is removed therefrom, into a position wherein said conveying direction is directed at an angle with respect to a transport path of the container through a shed, via which transport path the container is supplied or discharged, and wherein the container is at least introduced into the loading position or is removed from the loading position in a direction substantially transverse to said conveying direction of said buffers.

12. A method according to claim 10, wherein the quantity of animals gathered on said buffers is determined, and wherein the conveying sense of said distributing conveyor is reversed in response to reaching limit values of the quantity of animals gathered on a buffer.

13. A method according to claim 12, wherein deviations of quantities of animals gathered on the buffers, with respect to target values are registered and wherein said limit values are adjusted in response to said registered deviations.

14. A method according to claim 10, wherein animals supplied via the supply track are moved to said buffers by the distributing conveyor, at least initially substantially transversely to the direction of discharge via said buffers.

15. A method according to claim 10, further comprising the steps of:

delivering animals from a first buffer part of each of said two buffers to a second buffer part of each of said two buffers, said second buffer parts each comprising a plurality of vertically stacked tiers, said tiers each comprising a conveyor, and delivering said animals into said container by inserting said tiers into said container, and subsequently retracting said tiers from said container while simultaneously driving said conveyors of said tiers to deliver said animals into said container.

16. An apparatus for loading poultry into containers, comprising:

a supply track for supplying caught animals and at least one buffer, said buffer comprising a first buffer part for gathering and receiving a group of animals to be loaded into a container, and a second buffer part for keeping ready animals which are to be transferred into a container, the second buffer part having a plurality of vertically stacked tiers, wherein at least a downstream end of the first buffer part is vertically movable for loading gathered animals to each of said tiers, said apparatus further comprising at least one drive means for driving vertical movements of at least said downstream end of said first buffer part, which at least one drive means is located at a level above a highest level of said tiers of said second buffer part.

17. An apparatus according to claim 16, each of said tiers comprising a conveyor, wherein said ready animals gathered in said plurality of vertically stacked tiers of said second buffer part are delivered from said tiers into said container by inserting said tiers into said container, and subsequently retracting said tiers from said container while simultaneously driving said conveyors of said tiers to deliver said animals into said container.

18. An apparatus according to claim 16, said first buffer part comprising a conveyor belt and a covering disposed above said conveyor belt, said covering forming a tunnel effective to constrain said animals against said conveyor belt while in said first buffer part.

* * * * *